United States Patent
Yeshayahu et al.

(10) Patent No.: US 12,327,243 B2
(45) Date of Patent: Jun. 10, 2025

(54) DYNAMIC MULTI-PARTY COMPUTATION FOR SECURELY UTILIZING AND STORING A SECRET DATA-ITEM

(71) Applicant: IRONVEST, INC., New York, NY (US)

(72) Inventors: Kfir Yeshayahu, Tzur Yigal (IL); Avi Turgeman, New York, NY (US)

(73) Assignee: IRONVEST, INC., New York, NY (US)

( * ) Notice: Subject to any disclaimer, the term of this patent is extended or adjusted under 35 U.S.C. 154(b) by 74 days.

(21) Appl. No.: 18/395,578

(22) Filed: Dec. 24, 2023

(65) Prior Publication Data

US 2024/0220973 A1    Jul. 4, 2024

Related U.S. Application Data

(60) Provisional application No. 63/477,997, filed on Dec. 30, 2022.

(51) Int. Cl.
*G06Q 20/38* (2012.01)
*G06Q 20/40* (2012.01)

(52) U.S. Cl.
CPC ..... *G06Q 20/3829* (2013.01); *G06Q 20/3821* (2013.01); *G06Q 20/40975* (2013.01)

(58) Field of Classification Search
None
See application file for complete search history.

(56) References Cited

U.S. PATENT DOCUMENTS

| | | | | |
|---|---|---|---|---|
| 11,374,750 | B2* | 6/2022 | Dolan | H04L 9/0841 |
| 12,231,533 | B1* | 2/2025 | Thackston | G06F 21/602 |
| 2008/0082817 | A1* | 4/2008 | Takahashi | G06F 21/31 |
| | | | | 713/155 |
| 2016/0294562 | A1* | 10/2016 | Oberheide | H04L 9/0863 |
| 2020/0250327 | A1* | 8/2020 | Naraidoo | G06F 11/1464 |
| 2023/0177496 | A1* | 6/2023 | Le Van Gong | G06Q 20/3829 |

(Continued)

OTHER PUBLICATIONS

Keyless Technologies, "A beginner's guide to Shamir's Secret Sharing", Mar. 7, 2020 (Year: 2020).*

*Primary Examiner* — Neha Patel
*Assistant Examiner* — Timothy Paul Sax
(74) *Attorney, Agent, or Firm* — AlphaPatent Associates Ltd.; Daniel J. Swirsky

(57) ABSTRACT

Dynamic multi-party computation for securely utilizing and storing a secret data-item. A method includes: (a) receiving or generating a secret data-item (S); (b) dividing the secret data-item (S) into shares; (c) at a first electronic device, locally encrypting a first share (S-1) into a first encrypted share (ES-1), by using a private encryption key of the first electronic device as encryption key; (d) at a second, different, electronic device, locally encrypting a second share (S-2) into a second encrypted share (ES-2), by using a private encryption key of the second electronic device as encryption key; (e) storing the first encrypted share (ES-1) and the second encrypted share (ES-2) on one or more storage devices; (f) subsequently, dynamically replacing the first encrypted share (ES-1) with a replacement encrypted share (ES-1B) that is the first share (S-1) of the secret data-item encrypted by using a private encryption key of a third electronic device as encryption key.

20 Claims, 2 Drawing Sheets

(56) References Cited

U.S. PATENT DOCUMENTS

| | | | | |
|---|---|---|---|---|
| 2023/0259640 A1* | 8/2023 | Metzler | ............... | G06F 21/6218 |
| | | | | 713/191 |
| 2023/0396419 A1* | 12/2023 | Such Vicente | ........ | G06F 21/602 |
| 2024/0144254 A1* | 5/2024 | Kang | .................... | H04L 9/3255 |
| 2024/0381298 A1* | 11/2024 | Sun | ....................... | H04W 64/00 |

* cited by examiner

DYNAMIC MULTI-PARTY COMPUTATION FOR SECURELY UTILIZING AND STORING A SECRET DATA-ITEM

CROSS-REFERENCE TO RELATED APPLICATIONS

This patent application claims benefit and priority from U.S. 63/477,997, filed on Dec. 30, 2022, which is hereby incorporated by reference in its entirety.

FIELD

Some embodiments are related to the field of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some of these activities may require a user to enter a username and a secret password or passphrase or Personal Identification Number (PIN), in order to authenticate the user to a server and/or in order to enable access of only authorized user(s) a privileged resource or to a privileged functionality.

SUMMARY

Some embodiments provide devices, systems, and methods for Multiple-Party Computation (MPC) and for Secure MPC (SMPC), particularly for securely utilizing and/or processing and/or storing a secret data-item (e.g., which may be a cryptographic key, or a set of one or more keys or credentials that are used for accessing a crypto-currency asset or account). For example, the secret data-item is split into a plurality of shares; each share is encrypted by using a different encryption key that corresponds to a Public Key of a different device; and the encrypted shares are stored across a plurality of storage nodes. Importantly, a dynamic recycling/reshuffling/re-encryption scheme operates, from time to time and/or when one or more conditions hold true, to re-encrypt a particular encrypted share with a different encryption key (that corresponds to a Public Key of a different device), and/or to store such replacement/re-encrypted share in a different storage node. The dynamic re-encrypting and re-shuffling operations increase the resilience of the system towards attacks or security breaches.

Some embodiments provide dynamic multi-party computation for securely utilizing and storing a secret data-item. For example, a method includes: (a) receiving or generating a secret data-item (S); (b) dividing the secret data-item (S) into shares; (c) at a first electronic device, locally encrypting a first share (S-1) into a first encrypted share (ES-1), by using a private encryption key of the first electronic device as encryption key; (d) at a second, different, electronic device, locally encrypting a second share (S-2) into a second encrypted share (ES-2), by using a private encryption key of the second electronic device as encryption key; (e) storing the first encrypted share (ES-1) and the second encrypted share (ES-2) on one or more storage devices; (f) subsequently, dynamically replacing the first encrypted share (ES-1) with a replacement encrypted share (ES-1B) that is the first share (S-1) of the secret data-item encrypted by using a private encryption key of a third electronic device as encryption key.

Some embodiments may provide other and/or additional benefits or advantages.

DETAILED DESCRIPTION OF SOME DEMONSTRATIVE EMBODIMENTS

Figure 1:
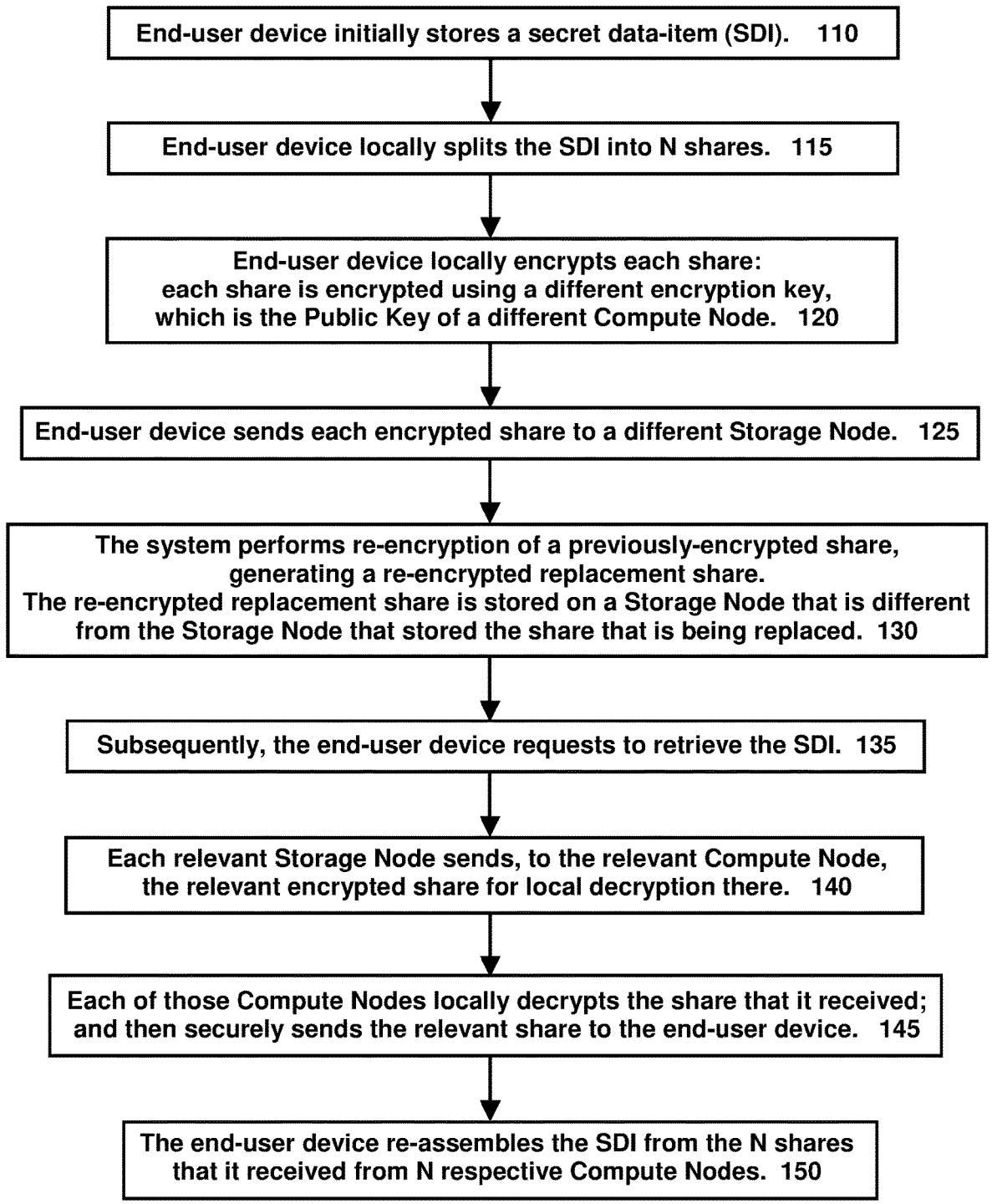
FIG. 1 is a flow-chart of a method, in accordance with some demonstrative embodiments.

Some embodiments provide a Distributed MPC technique or a Dynamic MPC technique or a Dynamically-Changing MPC technique, for securely utilizing and processing a secret data-item, and for distributing a plurality of cryptographic keys that encrypt different pieces (or portions, or shares) of the secret data-item. For example, a plurality of different electronic devices participate in the Dynamic MPC technique. Each of the electronic device has its own Private Key, that remains securely stored within that particular electronic device, and that never leaves that particular electronic device. The system protects a secret data-item, by dividing it to a plurality of portions of "shares". Each share of the secret data-item is encrypted by a different Private Key of a different electronic device. Each Private Key remains securely within the single electronic device that utilized it, and may optionally be utilized via a particular encryption/decryption application that runs on that electronic device (e.g., as a stand-alone application or "app", or as a browser extension or add-on or plug-in). In order to encrypt or decrypt the secret data-item, the relevant share of the secret data-item is sent (e.g., by a central node, or by one of the electronic devices that operates as a central node) to the relevant electronic device that has the relevant Private Key, which in turn performs the encryption/decryption or other cryptographic operation (e.g., digitally signing) and returns the processed output to the central node, thereby providing the aggregate outputs which together provide the end-user device the requested digital result (e.g., encryption result, decryption result, digital signing on a transaction). All the above is performed via the Dynamic MPC system, without any entity "seeing" or knowing the fully-decrypted secret data-item. The secret data-item can be stored in a central node or other centralized location or database, or may be stored in a blockchain dataset or other dataset, or may be stored as distributed shares across a plurality of storage devices or electronic devices. In the Dynamic MPC technique, the Private Keys that are used for the cryptographic operations can be shuffled or rotated or otherwise altered, based on a deterministic dynamic shuffling scheme or based on a pseudo-random dynamic shuffling scheme; such that Electronic Device 1 utilizes its Private Key to encrypt Share 1 of the secret data-item, whereas later, Electronic Device 2 utilizes its Private Key to encrypt Share 1 of that secret data item and Electronic Device 2 goes offline or disconnects from the network or becomes unavailable. In some embodiments, dozens or hundreds or even thousands of electronic devices may participate, each one with its own Private Key, in encrypting/decrypting a single secret data-item in the Dynamic MPC scheme that shuffles among the Shares (portions) of the secret data-item. The system thus provides protection against attacks, particularly when a large number of electronic devices participate in encrypting a single data-item, and particularly when many of those electronic devices log-out of the network (or become unavailable) and other electronic devices dynamically join and participate in the distributed MPC technique.

In some embodiments, the Dynamic Shuffling of a particular encrypted share of the secret data-item, can be performed as follows. Share S1 is initially encrypted by Device D1, with its Private Key K1 (denoted PrK1), into Encrypted Share ES-1; which can be stored externally of Device D1 (e.g., in a central node, in another node of the network, in a database, in a blockchain, or the like). After a pseudo-random or deterministic time-period, in order to perform the Dynamic Shuffling, Device D1 receives back the Encrypted Share ES-1, and decrypts it using its own Private Key K1; and then encrypts if locally (within Device D1) with the Public Key (denoted PuK2) of Device D2, into Encrypted Share ES-1A, and sends it to Device 2; which in turn, locally decrypts (within Device D2) the Encrypted Share ES-1A to temporarily have the non-encrypted share ES, and then locally encrypts it (within Device D2) with its own Private Key (denoted PrK2) of Device D2 into Encrypted Share ES-1B; and Device D2 sends that fresh Encrypted Share ES-1B to the central node or other database or blockchain where Encrypted Shares of the secret data-item are stored. The new Encrypted Share ES-1B replaces there the previous Encrypted Share ES-1; and also, Device D1 deletes any local copies of the Share that it had temporarily processed (the encrypted ES-1A, and the non-encrypted share S1 that was temporarily stored on Device D1 for creating ES-1A); and also, Device D2 deletes any local copies of the Share that it had temporarily processed (the encrypted ES-1B, and the non-encrypted share S1 that was temporarily on Device D2 for creating ES-1B).

In some embodiments, multiple (e.g., three) types of nodes may be used; although their functionalities may optionally be combined; for example, a plurality of Compute Nodes, a plurality of Storage Nodes, and a plurality of Operator Nodes.

Glossary

Secret Part (K1, . . . , Kn)—indicates a sliced part or a portion or a "share" of private information (a secret data-item), such as a private key or a string sequence that needs to be securely stored and/or securely processed and/or securely utilized. All the n parts together make up the one full secret.

Client User (U)—indicates an end-user device of a user, that is requesting to store or to reveal or to utilize or to retrieve a secret; optionally via a native application or "app" or mobile app, or via a browser extension or plug-in or add-on.

Compute Node (C)—indicates a client endpoint that is capable of performing the task of decrypting/encrypting a secret or a part of a secret (e.g., another user's secret, or a portion thereof), by using its own Private Key (namely, using the Private Key of that same Compute Node, which is securely stored within that Compute Node, and which never leaves that Compute Node). The Compute Node may be, for example, a desktop computer, a laptop computer, a smartphone, a tablet, or other electronic device that is capable of (i) communicating with one or more other devices over the Internet or over HTTPS or over TLS-SSL or over other communication methods, and (ii) performing encryption/decryption operations (or other cryptographic operations, such as digitally signing) using its own Private Key that never leaves that same Compute Node. It is noted that the Compute Node may publish or send out its own Public Key, which other endpoints or nodes may utilize during the dynamic rotation/shuffling/recycling process.

Storage Nodes (Si1, . . . , Sin)—indicates a device or a node endpoint within a Storage Group, such that all n storage nodes are replicas and hold the same already-encrypted information. For example, a Storage Node stores an encrypted portion of a secret of a user. Accordingly, Storage Nodes are in charge of storing the encrypted portions of users' secrets, and/or mapping between secrets (or secret-portions) and Compute Nodes that hold the relevant respective decryption key, and/or handling users' requests (e.g., to encrypt a secret, to decrypt a secret, to digitally sign a secret, to otherwise utilize a secret), and/or maintaining the availability of access to the secrets.

Storage Group (S1, . . . , Sn)—indicates a group of Storage Nodes that holds different information; for example, each Storage Node (Si) may be implemented as a separate or stand-alone database or dataset or blockchain. Each Storage Node Si of the Storage Group, holds the Ki part (or share, or portion) of all stored secrets (namely, stores the i part of a secret K).

Operator Node (O1, . . . , On)—indicates a group of nodes that orchestrate the system operations among Users, Compute Nodes, and Storage Nodes. The Operator Nodes do not store any secrets, and do not compute or perform any encryption/decryption operations with regard to any shares of any secret; rather, the Operator Nodes maintain a view of the network and provide Application Programming Interface (API) access for other network participants.

In some embodiments, the system operates in accordance with (and is configured to enforce) the following rules:

Rule 1: no network endpoint can ever see a pure (non-encrypted) full secret, except for the secret owner client itself.

Rule 2: the system ensures that there is always (at any given time-point) at least one Compute Node that is available online for each part of each secret on the network; with permitted exceptions as defined in Rule 3.

Rule 3: a temporary loss of access to a secret may occur, and is an eligible event and not an anomaly; and the system may be configured to ensure that there is a sufficient number of online nodes (e.g., by providing Compute Nodes and/or Storage Nodes that are controlled by a trusted entity or the system administrator) to ensure up to T seconds of temporary lost access to a secret; wherein T is a pre-defined or configurable threshold value (e.g., 15 or 30 seconds).

Rule 4: the system is configured to avoid or to prevent, at all costs and in all scenarios, a permanent loss of access to any secret; or, the system is configured such that the probability of permanently losing access to a secret on this system is equal to or is generally similar to (or is smaller than) the probability of permanently losing access to a file on a conventional cloud storage system.

Rule 5: a Compute Node never has access (not even temporarily or momentarily) to any full un-encrypted secret.

Rule 6: a Compute Node has temporary or momentary access to a pure (un-encrypted) part (portion, share) of a secret, only momentarily for a very short time-period, only when encrypting that pure part of the secret. A Compute Node never stores any secret part(s) in an un-encrypted form, other than momentarily storage of a secret part in its volatile memory (e.g., RAM) for immediate encryption purposes, and not in any non-volatile memory or storage unit (e.g., not in HDD or SSD or Flash memory). In some embodiments, a Compute Node actively erases from its memory any un-unencrypted part of any secret, immediately upon generating from it the corresponding encrypted part (e.g., by actively emptying or cleaning or voiding the Cache memory, and/or by writing arbitrary values or particular values into already-used or recently-used memory regions).

Rule 7: the same Compute Node never encrypts more than one part of the same secret. For example, Device D1 encrypts Share S1 of a secret S; and Device D2 encrypts Share S2 of that secret S; and Device D1 does not encrypt, ever, any additional share (such as Share S3 or share S9) of that secret S.

Rule 8: a Compute Node is considered as being Available to perform a task, if (and only if) that Compute Node is operational (e.g., turned on), and is connected to the relevant communication network (e.g., the Internet), and is currently running the particular application or app or browser extension that is configured to perform the operations of a Compute Node, and/or is logged-in to a the Dynamic MPC service and/or is otherwise signaling or broadcasting to other node(s) that it is Available to perform a task.

Rule 9: a Storage Node never sees or stores a full secret in pure/un-encrypted form.

Rule 10: a Storage Node never sees or stores a pure/un-encrypted part of any secret.

Rule 11: a Storage Node receives and stores only one or more already-encrypted parts of secret(s).

Rule 11: Operator Nodes (or Control Nodes) are responsible for managing or directing the operations of other nodes (Compute Nodes, Storage Nodes), and/or for performing or directing brokerage operations among such other nodes, and/or for allocating which share of which secret should be encrypted by which Computer Node and/or should be then stored on which particular Storage Node.

Rule 12: Operator Nodes never see or access or store any encrypted part of any secret and/or any un-encrypted part of any secret.

Rule 13: Operator Nodes store, utilize, and operate on metadata only.

Other suitable rules may be defined, implemented, and enforced.

The above-mentioned rules, and/or other rules, may be configured in the system and/or may be enforced by compute node/s and/or control node/s and/or storage node/s, or by a server or unit that controls the operation of one or more nodes. In some embodiments, the control may be achieved by using a blockchain dataset or other database or list or map or legend, which may be centralized or may be distributed across multiple nodes, that keeps track of which share of which secret data-item was encrypted by which particular electronic device, and was stored on which particular storage unit; and such control unit or control node also keeps track, for example, which electronic devices (compute nodes) were already utilized for encrypting a share of a particular secret, and which other electronic devices were not yet used (and, are available) for encrypting any share of that particular secret; and similarly, may also keep track, which storage unit or storage node was already utilized for storing an encrypted share of a particular secret, and which other storage nodes were not yet used for (and are available for) storing any encrypted share of that particular secret. In some embodiments, each node may signal or broadcast to one or more other node(s), a message indicating which secret data-items (e.g., identified by a unique ID number that can be assigned by the control node to each new secret) were already handled by that node; for example, indicating that Compute Node number 1256 has already encrypted one share of Secret number 4527; such that no other share of that particular Secret would be allocated again to be encrypted by that particular Compute Node. In accordance with some embodiments, such information may be stored (additionally or alternatively) in a central server or in a blockchain dataset or in a control node.

Some demonstrative embodiments may utilize a computerized method or process that implements the following pseudo-code, denoted Pseudo-Code A, for storing a secret in the Dynamic MPC system.

1. User (U) encrypts secret K with $U_{public} \rightarrow U_{public\ (K)} = E(K)$
   a. This step is done if the user wants to eventually retrieve the secret,
      as opposed to using it to sign a transaction.
   b. Otherwise, let's assume E(K)=K.
2. U slices E(K) to N pieces→$E(K)_1 \ldots E(K)_n$ using Shamir Secret Sharing.
3. U asks O(operator) the list of available C(compute) units public keys and references, and receives:

{$N \times R$ public keys: $\{Cn_{public}, Cn_{websocket}\}$}

U now has N parts, each part includes {encryption, signature}
4. U encrypts $(E(K)_1) \ldots (E(K)_n)$ with $Cx_{public} \ldots Cy_{public}$ and gets $Cx_{public}(E(K)_1) \ldots Cy_{public}(E(K)_n)$
5. U attaches $Cx_{public}(E(K)_1) \ldots Cy_{public}(E(K)_n)$ with a unique $K_{ID}$
6. U sends the encrypted parts to Storage Nodes Sm . . . Sn which store them accordingly.
7. U disposes of the original secret K from its memory.

Pseudo-Code A: Storing a Secret

As demonstrated in Pseudo-Code A, the end-user device (U) encrypts its secret K with its Public Key $U_{public}$, generating an encrypted version of the secret K; such that: $E(K)=U_{public}(K)$. This is performed only if the end-user device intends or desires to subsequently retrieve the secret K. In contrast, if the end-user device does not intend to subsequently retrieve the secret K, such as if the end-user device only utilizes the secret K in order to digitally sign a transaction, then the system may optionally utilize E(K)=K.

Then, in accordance with some demonstrative embodiments, the end-user device (U) slices or splits or divides the encrypted secret, denoted E(K), into n pieces or portions or parts or shares; denoted $E(K)_1$ through $E(K)_n$. This can be done using Shamir Secret Sharing or other suitable method.

Then, in accordance with some demonstrative embodiments, the end-user device (U) asks an Operator Node (O) for a list or dataset or pool of currently-available Compute Nodes (C), that are available for tasks. The Operator Node responds to the end-user device (U) with pairs of data-items, each pair including (i) a reference (e.g., a WebSocket) of a currently-available Compute Node and (ii) the Public Key of that currently-available Compute Node. Each pair in the response is in the format of: $\{Cn_{public}, Cn_{websocket}\}$.

Then, the end-user device (U) encrypts each part of the secret, from $E(K)_1$ to $E(K)_n$, with the corresponding Public Key of the corresponding Compute Node from $Cx_{public}$ to $Cy_{public}$, and thus creates encrypted parts from $Cx_{public}(E(K)_1)$ to $Cy_{public}(E(K)_n)$.

Then, the end-user device (U) attaches a unique identifier Kid to each encrypted part, from $Cx_{public}(E(K)_1)$ to $Cy_{public}(E(K)_n)$.

Then, in accordance with some demonstrative embodiments, the end-user device (U) sends or transports or transmits the encrypted parts to Storage Nodes Sm through Sn, which store them accordingly.

Then, in accordance with some demonstrative embodiments, the end-user device (U) disposes of the original secret K from its memory unit(s) and its storage unit(s), including from its volatile memory units and its non-volatile memory units; for example, by actively overwriting them with zero values or with pseudo-random bits, or by performing such overwriting seven times or other number of iterations. This ensures that there remains no temporary copy of the non-encrypted share, in such end-user device that was utilized for encrypting it and for sending it out in encrypted form to a storage node.

Some demonstrative embodiments may utilize a computerized method that implements the following pseudo-code, denoted Pseudo-Code B, for restoring a secret from the Dynamic MPC system:

1. U authenticates against the wallet and against Operator O.
2. U sends a signed request to O to retrieve K.
3. O tells Sm . . . Sn to send all $K_{ID}$s to Cx . . . Cy
4. Sm . . . Sn validates that the encrypted data matches the signed request for retrieval of information.
5. Sm . . . Sn P2P to relevant Cx . . . Cy with the request, $K_{ID}$ and target.
6. Cx . . . Cy validates that the request is signed by the right U, and decrypts $E(K)_i$ with its own private key $Cx_{private}(E(K)_1) \ldots Cy_{private}(E(K)_n) \rightarrow (E(K)_1) \ldots (E(K)_n)$
7. Cx . . . Cy P2P to U with the result, or alternatively performs the action (e.g., transaction signing) with the encrypted data.
8. Cx . . . Cy disposes of all secret pieces from its memory.

Pseudo-Code B: Restoring a Secret

As demonstrated, such process (or other suitable methods) may be used for restoring a secret in a secure manner.

In some embodiments, the secret data-item can be utilized immediately for—or exclusively for—immediately signing on a digital transaction (or a crypto-currency transaction), or immediately validating a digital transaction (or a crypto-currency transaction), without necessarily also storing long-term the decrypted secret data-item on any end-user device, to avoid unnecessary exposure of the secret data-item.

Some embodiments may utilize a computerized method that implements the following pseudo-code, denoted Pseudo-Code C, for performing Dynamic rotation/recycling/shuffling of encrypted parts of a secret via the Dynamic MPC system:

1. $O_1 \ldots O_n$ are constantly receiving signals from Opt-In $C_1 \ldots C_n$
2. $O_1 \ldots O_n$ are checking if the conditions for the threshold of the number of replicas of secrets $K_1 \ldots K_n$ are met
3. For each $K_i$ that doesn't meet the threshold
   a. O creates pairs ($K_i \in C_A$, $K_i \notin C_B$)
   b. Create P2P connection between every pairs ($C_A$, $C_B$) and ask them to replicate $K_i$ from $C_A$ to $C_B$
   c. $C_A$ asks $C_B$ for its public key
   d. $C_A$ decrypts $K_i$ with its private key and encrypts it with $C_B$ public key
   e. $C_A$ sends $C_B$ the encrypted $K_i$ to a Storage $S_m$ Pseudo-Code C: Recycling/Shuffling/Rotating Portions of the Secret As demonstrated in Pseudo-Code C, the Operator Node checks which Compute Nodes are online and currently available. If their number is below a particular threshold value, then the Operator Node triggers the creation of another redundancy replica. For example, it performs the following operations: connecting one Compute Node that had an encrypted a particular secret-portion (Compute Node Ca) to another Compute Node Cb), such that those two Compute Nodes communicate directly between them via peer-to-peer (P2P) communication or via direct point-to-point (P2P) communication (and not via the Operator Node, and not via any other node); the Compute Node Cb for the new replica sends his Public Key to the Compute Node Ca having the old secret-portion; the Compute Node Ca decrypts locally the partial secret with its own Private Key, and then immediately encrypts that un-encrypted portion using the Public Key of the other Compute Node, and sends it to a Storage Node (also brokered by the Operator Node, and performed via direct P2P communication).

Reference is made to FIG. 1, which is a flow-chart of a method in accordance with some demonstrative embodiments.

For example, an end-user device initially has or initially stores a secret data-item (SDI) that it desires to secure (block 110).

The end-user device locally splits or divides or slices the SDI into N shares (or portions, or slices); wherein N is a positive integer (block 115). For example, N can be in the range of 10 to 5,000, or other suitable range.

The end-user device locally encrypts each share, with an encryption key that is the Public Key of a different Compute Node (block 120). For example, Share S1 is encrypted using (as encryption key) the Public Key of Compute Node A; and Share S2 is encrypted using (as encryption key) the Public Key of Compute Node B.

The end-user device sends each encrypted share, to a different Storage Node (block 125). For example, the first Encrypted Share is sent from the end-user device to Storage Node AA; and the second Encrypted Share is sent from the end-user device to Storage Node BB.

At particular time-points, and/or if one or more conditions hold true, an encrypted share is re-encrypted from (i) being encrypted using the Public Key of Device 1, to (ii) being encrypted using the Public Key of Device 2 (block 130). For example, the first Encrypted Share is sent from Storage Node AA (which stores it) to Compute Node A; and Compute Node A decrypts that share (since Compute Node A, and only Compute Node A, has the corresponding Private Key that can decrypt this share); and Compute Node A immediately re-encrypts that share by using (as encryption key) the Public Key of another Compute Node, such as Compute Node C; thereby generating a freshly re-encrypted share that replaces the "first encrypted share". The replacement encrypted share is sent from Compute Node A; either to the same Storage Node AA, or (in some embodiments) to a different or a new Storage Node CC, which does not yet store any encrypted share of that particular SDI.

Subsequently, the end-user device may request to retrieve the SDI (block 135). Upon such request, each relevant Storage Node sends, to the relevant Compute Device, the relevant share for decryption (block 140). For example, Storage Node BB sends the second encrypted share to Compute Node B, which decrypts it locally; and Storage Node CC sends the "replacement encrypted share" (of the first share) to Compute Node CC, which decrypts it locally. Each of those Compute Nodes then sends the relevant Share to the end-user device (block 145), over a secure communication channel; and the end-user device may re-assemble the secret data-items from the shares that it receives (block 150).

It is noted that the above is only a non-limiting example, and other flows of operations may be used, and other scenarios may be implemented or protected.

Figure 2:
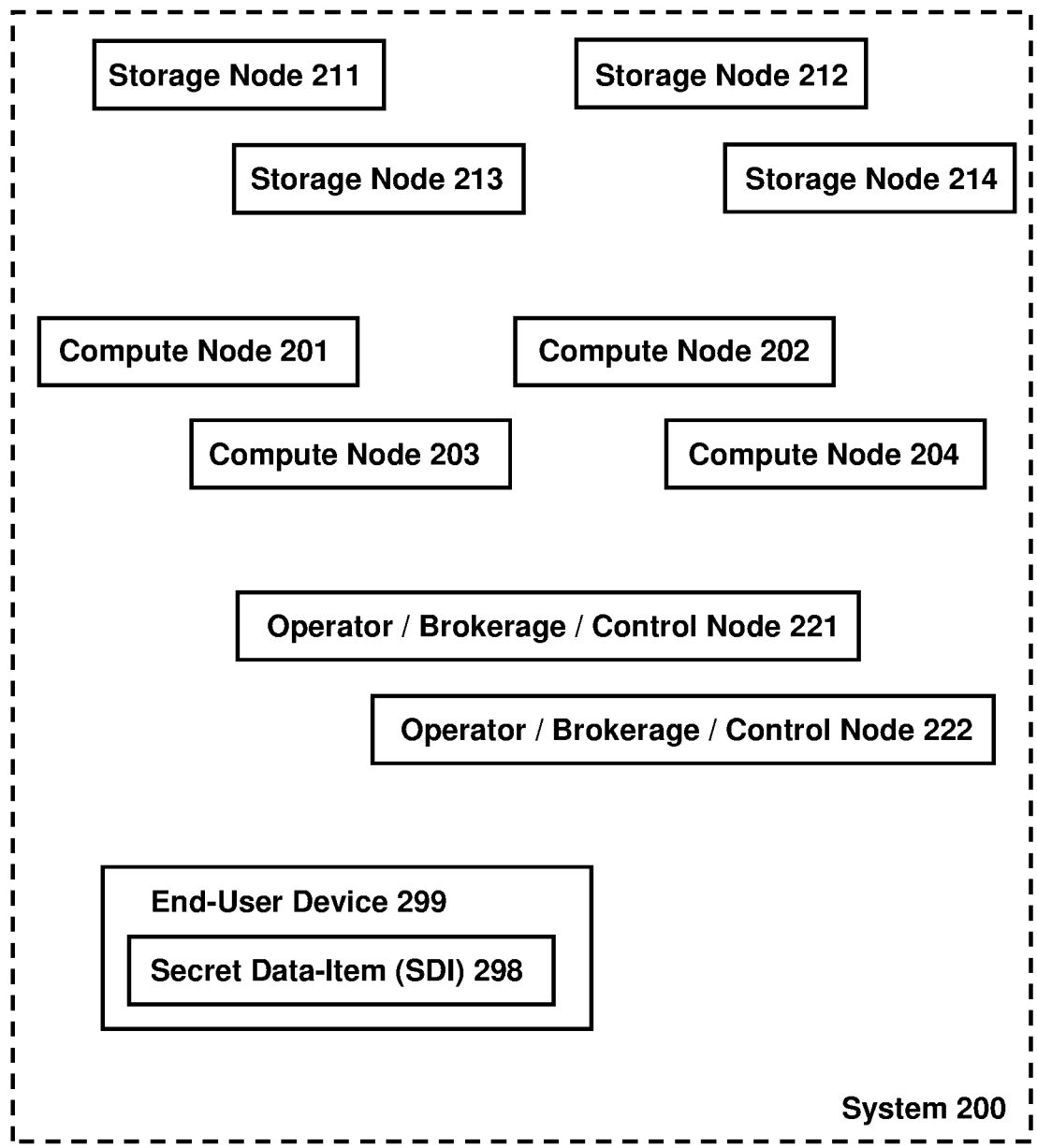
FIG. 2 is a schematic block-diagram illustration of a system, in accordance with some demonstrative embodiments.

Reference is made to FIG. 2, which is a schematic block-diagram illustration of a system 200, in accordance with some demonstrative embodiments. System 200 may include, for example: a plurality of Compute Nodes, such as Compute Nodes 201 to 204; a plurality of Storage Nodes, such as Storage Nodes 211 to 214; a plurality of Operator/Brokerage/Control Nodes 221 to 222 (which may also be referred to as Operator Nodes, or Control Nodes, or Brokerage Nodes).

In some embodiments, each Compute Node may be implemented as an electronic device (e.g., laptop computer; desktop computer; server computer; smartphone; tablet; or the like), that is connected to the Internet (or to other communication network), and that has its own pair of Private Key and Public Key, and that maintains its own Private Key confidential at all times, and that publishes or allows to publish its own Public Key. A Compute Node is considered to be "currently available" if it is operational (e.g., power-on, rather than powered-off and rather than being in a sleep mode or standby mode), and is currently online (e.g., currently connected to the Internet), and is currently running (in a main window, or in the background or as a background process or a background thread) the particular processing algorithm in accordance with some embodiments, such as via a dedicated application or via a stand-alone application or via an application that runs within a web browser or as part of a browser extension/add-on/plug-in.

In some embodiments, if the number of currently-available Compute Nodes is below a particular threshold value, then an entity that controls or that operates the system 200 may (automatically, or manually) launch or invoke or span additional Compute Nodes; for example, by spanning or launching or invoking Virtualized Compute Nodes in a cloud-computing architecture, or by activating actual electronic devices or connecting them to the network, or by otherwise causing additional Compute Nodes to be introduced or added to the system.

Similarly, in some embodiments, if the number of currently-available Storage Nodes is below a particular threshold value, then an entity that controls or that operates the system 200 may (automatically, or manually) launch or invoke or span additional Storage Nodes; for example, by spanning or launching or invoking Virtualized Storage Nodes in a cloud-computing architecture, or by activating actual electronic devices or connecting them to the network, or by otherwise causing additional Storage Nodes to be introduced or added to the system.

An end-user device 299 is also part of system 200, or otherwise interacts with system 200 or receives from system 200 services of securely storing and/or processing a Secret Data-Item (SDI) 298. The end-user device 299 may be an electronic device operated by an end-user, such as a smartphone, a tablet, a laptop computer, a desktop computer; or it may be a computing device or a computer or a server that is connected to the Internet and performs various computing operations for a human user or for an organization or a business entity. The end-user device 299 need not have a human user operating it or carrying it, at a particular time or all the time; and it may be a computer or a server or other computing device that desires to benefit from the services that system 200 can provide for securely storing, processing and/or utilizing secret data-items.

The secret data-item (SDI) 298 can be, by itself, an encryption/decryption key that may be used to access a privileged account, to encrypt other data, to decrypt other data, to digitally sign other data, to digitally sign on a transaction, or the like.

The SDI 298 is split or sliced or spliced or divided into a plurality of Shares (or portions, or slices); this is performed locally and securely within the end-user device 299. For example, a single secret data-item SDI 298 is split into three Shares, denoted S1 and S2 and S3, via Shamir Secret Sharing (SSS), or Blakley's secret sharing scheme, or Chinese remainder theorem secret sharing scheme, or Asmuth-Bloom's threshold secret sharing scheme, or other suitable secret sharing scheme or secret splitting scheme.

End-user device 299 sends a query to Operator/Brokerage/Control Node 221, requesting to know which Compute Nodes are currently-available for the purpose of encrypting three Slices of a secret. The Operator/Brokerage/Control Node 221 responds to end-user device 299 with a message that indicates pairs of data-items: a first data-item indicating a unique reference ID of Compute Node 201 and the Public Key of Compute Node 201; a second data-item indicating a unique reference ID of Compute Node 202 and the Public Key of Compute Node 202; a third data-item indicating a unique reference ID of Compute Node 203 and the Public Key of Compute Node 203.

End-user device 299 proceeds to locally encrypt Share S1, utilizing the Public Key of Compute Node 201 as the encryption key for Share S1; thereby generating locally an encrypted version of Share 1, denoted ES-1. Similarly, device 299 proceeds to locally encrypt Share S2, utilizing the Public Key of Compute Node 202 as the encryption key for Share S2; thereby generating locally an encrypted version of Share 2, denoted ES-2. Similarly, device 299 proceeds to locally encrypt Share S3, utilizing the Public Key of Compute Node 203 as the encryption key for Share S3; thereby generating locally an encrypted version of Share 3, denoted ES-3.

Optionally, end-user device 299 locally attaches or adds, to each Encrypted Share, a unique ID that identifies or that indicates that this particular Encrypted Share is part of that particular SDI 298. For example, the original SDI 298 may have a unique identifier of "5678900"; and the three Encrypted Shares (ES1 and ES2 and ES3) of its sliced shares may have unique identifiers of "5678901" and "5678902" and "5678903", respectively.

End-user device 299 may ask the Operator/Brokerage/Control Node 221, which particular Storage Nodes are currently-available and should be used for securely storing the three encrypted shares that end-user device 299 has just locally generated. The Operator/Brokerage/Control Node 221 responds to end-user device 299, that Storage Nodes 211 and 212 and 213 are currently-available and should be used for securely storing the three already-encrypted shares that end-user device 299 has already generated within it.

End-user device 299 receives from the Operator/Brokerage/Control Node 221 relevant identifiers or pointers of the currently-available and currently-allocated Storage Nodes 211 and 212 and 213, and now initiates a direct P2P (peer-to-peer and point-to-point) communication with each one of them separately. For example, end-user device 299 securely sends (e.g., over HTTPS or TLS-SSL) the first encrypted share ES1 directly to Storage Node 211; end-user device 299 securely sends (e.g., over HTTPS or TLS-SSL) the second encrypted share ES2 to Storage Node 212; end-user device 299 securely sends (e.g., over HTTPS or TLS-SSL) the third encrypted share ES1 to Storage Node 213. In accordance with some embodiments, the system is configured to enforce that each single Storage Node (such as 211) will not store, at any given time-point, more than one Encrypted Share of the same secret; such that Storage node 211 is allowed to store ES1 but is not allowed to also store therein ES2 and/or ES3. Storage Node 211 is allowed to store therein one single encrypted share of Another secret data-item, and one single encrypted share of Yet Another secret data-item, and so forth; but is not allowed to store Two (or more) encrypted shares of a same particular secret data-item.

In accordance with some embodiments, end-user device 299 then proceeds to actively delete, from its own volatile and non-volatile storage units and memory units, the original SDI 298 (which was a non-encrypted data-item), and the multiple Shares S1 and S2 and S3 (in their unencrypted form), and the multiple Encrypted Shares ES1 and ES2 and ES3. End-user device 299 may actively overwrite, one time or seven times or a pre-defined number of times, with "all zero" values or with "all one" values or with a pseudo-random stream of bits, onto the memory regions or storage regions that had temporarily stored those data-items that are now desired to be actively erased; using a secure/active erasing process, a one-time erasing/overwriting process, a 3-pass or 7-pass erasing or overwriting or data-wiping process, or the like.

In accordance with some embodiments, a Mapping Unit or a Mapping Module may be stored or implemented on one or more devices or nodes of system 200, such as in the Operator/Brokerage/Control Node 221, to store and to later update a Shares Map that indicates where the plurality of encrypted shares are currently stored; reflecting that for a particular SDI 298 (which is not known, in unencrypted form and/or in encrypted form, to any single device or to any single entity in system 200), that original SDI 298 was sliced into three Shares that were encrypted into three encrypted shares (ES1 and ES2 and ES3), and further reflecting whose Public Key (namely, of which Compute Node) was used for encrypting each of those encrypted share, and further reflecting which Storage Node currently stores each of those encrypted shares. For example, the Mapping Unit may store a map that indicates, that for a particular secret data-item that had the unique identifier "5678900", which originally belonged to the particular end-user device 299 (having a unique device identifier), three Encrypted Shares were generated: a first Encrypted Share having unique identifier "5678901" which is currently stored on Storage Node 211, and a second Encrypted Share having unique identifier "5678902" which is currently stored on Storage Node 212, and a third Encrypted Share having unique identifier "5678903" which is currently stored on Storage Node 213.

The process to decrypt or to restore a previously-encrypted sliced SDI operates in a reverse manner. For example, the end-user device authenticates towards Operator/Brokerage/Control Node 221, and requests to retrieve or to utilize the particular secret data-item SDI 298 (e.g., identified via its unique identifier "5678900"). The Operator/Brokerage/Control Node 221 checks the Shares Map; determines which particular Storage Nodes are currently storing the encrypted shares of that request secret; and commands each one of those Storage Nodes to send the relevant Encrypted Share directly to the particular Compute Node whose Public Key was utilized (by the end-user device 299) to generate that Encrypted Share. For example, the Operator/Brokerage/Control Node 221 instructs Storage Node 211 to send the first Encrypted Share ES1 (identified via its unique identifier "5678900") directly to Compute Node 201; and Storage Node 211 does so via a secure, direct, P2P communication with Compute Node 201. Similarly, the Operator/Brokerage/Control Node 221 instructs Storage Node 212 to send the second Encrypted Share ES2 (identified via its unique identifier "5678902") directly to Compute Node 202; and Storage Node 212 does so via a secure, direct, P2P communication with Compute Node 202. Similarly, the Operator/Brokerage/Control Node 221 instructs Storage Node 213 to send the third Encrypted Share ES3 (identified via its unique identifier "5678903") directly to Compute Node 203; and Storage Node 213 does so via a secure, direct, P2P communication with Compute Node 203.

In some embodiments, each Storage Node (211, 212, 213) firstly validates, prior to the P2P transmission of the relevant Encrypted Share to the relevant Compute Node, that a digital signature (e.g., of end-user device 299) on the Encrypted Share indeed matches the digital signature (e.g., of end-user device 299) on the fresh request (conveyed from end-user device 299 to the Operator/Brokerage/Control Node 221) to retrieve or utilize that secret data-item.

The relevant Compute Nodes (201, 202, 203) receive via separate, secure, direct P2P communications channels, the relevant Encrypted Shares (ES1, ES2, ES3) that were sent separately by the relevant Storage Nodes (211, 212, 213). Each Compute Node (201, 202, 203) validates the digital signature of the retrieval requests matches the digital signature of the end-user device 299; and then, each Compute Node (201, 202, 203) utilizes its own Private Key to locally decrypt the Encrypted Share that was sent to it. Accordingly, Compute Node 201 utilizes its own Private Key to locally decrypt the first Encrypted Share ES1; and Compute Node 202 utilizes its own Private Key to locally decrypt the second Encrypted Share ES2; and Compute Node 203 utilizes its own Private Key to locally decrypt the third Encrypted Share ES3.

Each of the relevant Compute Nodes (201, 202, 203) then securely sends the relevant Share of the original SDI 298, to the end-user device 299; via a direct P2P secure communication channel (e.g., over HTTPS, or TLS-SSL). The end-user device 299 receives the three Shares, and assembles from them the original secret data-item which it can then utilize. Each of the relevant Compute Nodes (201, 202, 203) actively erases or wipes, from its volatile and non-volatile memory unit(s) and storage unit(s), the encrypted share that it temporarily held and the unencrypted version that it temporarily decrypted.

In some embodiments, if the end-user client or the client device, who owns the SDI or who created the SDI, requests or needs or requires the full SDI as a whole, then the plurality of portions or shares of the SDI are collected and re-assembled and the entire SDI is restored at the original end-user device or by a device that is controlled by the user of the original end-user device who created the SDI; and in such situations, the entire SDI will be re-assembled and constructed only within that end-client device, and the entire SDI will not be re-assembled or constructed or stored or any other device or node of the system. An example of such SDI can be, a password that the user utilizes in order to access a particular service or website; or a social security number of the user; or other SDI that the original user (who created the SDI in the first place) may wish to re-assemble and re-construct in its entirety, so that the user can utilize that SDI (e.g., in its plain-text/unencrypted version) at a particular time-point.

In other embodiments, or in particular implementations or scenarios or situations or use-cases (e.g., distributed authentication, decentralized authentication, distributed digital sighing, decentralized digital signing, or the like), the secret data-item (SDI) may be utilized by the system, or by a particular node of the system, or by a device of the end-user who created the SDI, or by a particular device on behalf of the user who created the SDI, without necessarily re-assembling all the pieces or portions of the SDI at the end-user device that owned or stored or created the original SDI, and/or without necessarily re-constructing the full original SDI on the end-user device of the user who created that SDI; since in some situations, the original owner or creator of the SDI does not necessarily need to have local access to the complete SDI in a plaint-text (un-encrypted) format. For example, the SDI may be a Private Key for of a crypto-currency wallet, or a Private Key of a crypto-currency account, or a Private Key of a crypto-currency entity or address, or a Private Key of a wallet that holds or stores or controls crypto-currency or virtual assets or all-digital assets or block-chain based assets or Non-Fungible Tokens (NFTs) or smart contracts or similar assets or tokens; and the original owner of the SDI may need to digitally sign (e.g., to digitally approve or submit or confirm or create) a blockchain transaction using that SDI (namely, using that Private Key which is the SDI). In such cases, the digital signing process can be performed in a distributed method; for example, each holder of a Share (piece, portion) of the SDI performs a part of the operation, and then sends the result of that operation to the next holder of the next Share (piece, portion) of that SDI, without ever sending (to the SDI owner, or to any other node or device) the partial secret itself (namely, the portion or part or share of the SDI that this particular node has utilized for performing the cryptographic operation). A suitable MPC-oriented or MPC-based algorithm may be utilized for such signature scheme. Other for example, a Threshold Signature Scheme (TSS) may be used, or other schemes or methods may be used for such node-by-node signing or computation or for step-by-step signing or computation.

In accordance with some embodiments, the Dynamic MPC scheme performs rotation/exchange/recycling/reshuffling/re-encoding of Encrypted Shares among devices, by replacing the encryption key in which a particular Encrypted Share is encrypted with a new Encryption Key. The dynamic recycling may be performed at pre-defined time-points or time-intervals (e.g., every 60 seconds), and/or at a time-interval that is selected pseudo-randomly within a pre-defined range (e.g., a time-interval that is selected pseudo-randomly from the range of 40 to 55 seconds), and/or at pre-defined time-points (e.g., every midnight GMT and every noon GMT), and/or if one or more conditions hold true (e.g., the Operator/Brokerage/Control Node 221 detects that the number of Compute Nodes that is currently available is below a particular threshold value, and/or that the number of Storage Nodes that is currently available is below a particular threshold value, and/or that a particular Compute Node or Storage Node is indicating that it is expected to go offline or to become unavailable, or the like).

In a demonstrative example, the Dynamic Shuffling may be performed as follows, continuing the above-mentioned example of the secret data-item SDI 298 that was encrypted into three Encrypted Shares ES1 and ES2 and ES3. The Operator/Brokerage/Control Node 221 determines to initiate a Dynamic Shuffling process with regard to the first Encrypted Share S1. It knows that the first Encrypted Shares S1 is currently stored in Storage Node 211; and that it was encrypted by the end-user device 299 which had used the Public Key of Compute Node 201 as the encryption key. The Operator/Brokerage/Control Node 221 determines that this first Encrypted Share ES1 (having the unique identifier "5678901", would be replaced by a new Encrypted Share, that will be denoted ES1-Replacement, and will have a unique identifier of "5678904", and will be encrypted by using the Public Key of Compute Node 214 as the encryption key, and will replace the Encrypted Share ES1. The Operator/Brokerage/Control Node 221 instructs Storage Node 211 to securely send the Encrypted Share ES1 to Compute Node 201, over a secure, direct, P2P communication channel between Storage Node 211 and Compute Node 204; and Storage Node 214 does so. Compute Node 201 receives from Storage Node 211 the first Encrypted Share ES1; and Compute Node 201 is the only device in system 200 that is capable of decrypting that Encrypted Share ES1, since it was encrypted using the Public Key of Compute Node 201 and thus only Compute Node 201 (which has the corresponding Private Key) can decrypt it. Compute Node 201 locally decrypts, using its own Private Key, the first Encrypted Share ES1; and now Compute Node 201 momentarily has, in unencrypted format, the content of that Share S1 of the original SDI 298. Compute Node 201 is further instructed by the Operator/Brokerage/Control Node 221, to immediately encrypt that freshly-decrypted Share S1, by utilizing as an encryption key the Public Key of Compute Node 204 (which Compute Node 201 obtains from the Operator/Brokerage/Control Node 221 or directly from Compute Node 204). Compute Node 201 operates accordingly, and immediately encrypts that freshly-decrypted Share S1, by utilizing as an encryption key the Public Key of Compute Node 204; thereby generating, locally within Compute Node 201, an updated Encrypted Share that replaces the previous "first Encrypted Share ES1", and that can be denoted as "Encrypted Share ES1-replacement". Compute Node 201 then actively erases and wipes clean, from its volatile and non-volatile memory unit(s) and storage unit(s), the Encrypted Shares ES1 that was sent to Compute Node 201, and the temporarily-stored freshly-decrypted version of Share S1 (that was momentarily available within Compute Node 201 for purposes of re-encrypting it into ES1-replacement).

Then, Compute Node 201 sends the newly-generated "Encrypted Share ES1-replacement" to Storage Node 211, indicating that this newly-generated "Encrypted Share ES1-replacement" has a new unique identifier ("5678904") and is replacing the previous Encrypted Share ES1 (which had a unique identifier "5678901". Storage Node 211 actively erases its own copy of Encrypted Share ES1; and now stores the "Encrypted Share ES1-replacement". Compute Node 201 further updates the Operator/Brokerage/Control Node 221 that the replacement process was performed; and that the Shares Map should be updated to reflect that the original secret data-item (SDI 298) is now stored as the following three encrypted shares: the first Encrypted Share is "Encrypted Share ES1-replacement" (unique identifier "5678904"), stored in Storage Node 211; the second Encrypted Share is ES2 (unique identifier "5678902"), stored in Storage Node 212; the third Encrypted Share is ES3 (unique identifier "5678903"), stored in Storage Node 213.

In some embodiments, optionally, the recycling or reshuffling or re-encoding of the first Share S1, from the first Encrypted Share ES1 into the freshly re-encrypted Encrypted Share ES1-replacement, can also be accompanied with a change of the Storage Node that stores that encrypted share. For example, Compute Node 201 may be instructed by the Operator/Brokerage/Control Node 221, not to send the Encrypted Share ES1-replacement to the same Storage Node 211 (from which Compute Node 201 has just obtained the first Encrypted Share ES1); but rather, to send the Encrypted Share ES1-replacement to a different Storage Node, such as to Storage Node 214, which does not yet store any Share of this particular SDI 298. In such case, the Operator/Brokerage/Control Node 221 updates the Shares Map to reflect that the original secret data-item (SDI 298) is now stored as the following three encrypted shares: the first Encrypted Share is "Encrypted Share ES1-replacement" (unique identifier "5678904"), stored in Storage Node 214; the second Encrypted Share is ES2 (unique identifier "5678902"), stored in Storage Node 212; the third Encrypted Share is ES3 (unique identifier "5678903"), stored in Storage Node 213. In some embodiments, the following method and system are utilized.

Encryption and Storage:

A secret data-item (SDI) is split or sliced or spliced or divided into a plurality of Shares (or portions, or slices); for example, a single secret data-item SDI is split into three Shares, denoted S1 and S2 and S3. The secret data-item (SDI) can be, by itself, an encryption/decryption key that may be used to access a privileged account, to encrypt other data, to decrypt other data, to digitally sign other data, to digitally sign on a transaction, or the like.

The splitting or the division of the secret data-item SDI into Shares (S1, S2, S3) can be performed by a Management and Mapping Unit, which also assigns each Share (S1, S2, S3) for encryption by a different electronic device.

In order to encrypt and to securely store the secret data-item SDI, each of the Shares (S1, S2, S3) is sent separately, over a secure communication channel (such as HTTPS or SSL-TLS) to a different Device. For example, Share S1 is securely sent from the Management and Mapping Unit to Device D1; Share S2 is securely sent from the Management and Mapping Unit to Device D2; Share S3 is securely sent from the Management and Mapping Unit to Device D3.

Each one of those Devices (D1, D2, D3) utilizes its own secret Private Key (K1, K2, K3, respectively) to encrypt the Share that was allocated to it; and the Private Key of each Device does not leave that Device.

For example, Device D1 utilizes its own Private Key (K1) to encrypt its Share S1 into an Encrypted Share ES1; and similarly, Device D2 utilizes its own Private Key (K2) to encrypt its Share S2 into an Encrypted Share ES2; and similarly, Device D3 utilizes its own Private Key (K3) to encrypt its Share S3 into an Encrypted Share ES3.

As a result, a plurality of Encrypted Shares (ES1 and ES2 and ES3) of the same secret data-item (SDI), are generated, using three different Private Keys (K1 and K2 and K3, respectively) on three different Devices (D1 and D2 and D3, respectively).

Each one of the Devices sends out its Encrypted Share, to a central storage location or to a non-central storage node, and such storage location(s) may be referred to as "Storage Array"; and the Management Unit keeps track which Share was assigned to which Device, and which Encrypted Share (that is stored in the Storage Array) was received from which Device.

Accordingly, Device D1 sends to Storage Array the Encrypted Share ES1 that Device D1 generated from Share S1 using its Private Key K1 as encryption key. Device D1 actively deletes, from its volatile memory and its cache units, the un-encrypted Share S1 that was temporarily or momentarily stored in Device D1 for the momentary purpose of encrypting it. Device D1 also actively deletes, from its volatile memory and its cache units, the Encrypted Share ES1 that Device D1 has generated and has sent out to the Storage Array.

Similarly, Device D2 sends to Storage Array the Encrypted Share ES2 that Device D2 generated from Share S2 using its Private Key K2 as encryption key. Device D2 actively deletes, from its volatile memory and its cache units, the un-encrypted Share S2 that was temporarily or momentarily stored in Device D2 for the momentary purpose of encrypting it. Device D2 also actively deletes, from its volatile memory and its cache units, the Encrypted Share ES2 that Device D2 has generated and has sent out to the Storage Array.

Similarly, Device D3 sends to Storage Array the Encrypted Share ES3 that Device D3 generated from Share S3 using its Private Key K3 as encryption key. Device D3 actively deletes, from its volatile memory and its cache units, the un-encrypted Share S3 that was temporarily or momentarily stored in Device D3 for the momentary purpose of encrypting it. Device D3 also actively deletes, from its volatile memory and its cache units, the Encrypted Share ES3 that Device D3 has generated and has sent out to the Storage Array.

Decryption:

In order to retrieve the secret data-item SDI, or in order to utilize it temporarily, the Management and Mapping Unit checks which particular Devices had encrypted each Encrypted Share; and allocates to each such Device the task of retrieving that Encrypted Share and decrypting it, using the Private Key of that Device. For example, Device D1 obtains from the Storage Array the Encrypted Share ES1; and utilizes the Private Key K1 of Device D1 to locally decrypt the Encrypted Share ES1 into non-encrypted Share S1; which, in turn, may be sent by Device D1 to a particular Requesting Device that needs to utilize the secret data-item SDI. Similarly, Device D2 obtains from the Storage Array the Encrypted Share ES2; and utilizes the Private Key K2 of Device D2 to locally decrypt the Encrypted Share ES2 into non-encrypted Share S2; which, in turn, may be sent by Device D2 to a particular Requesting Device that needs to utilize the secret data-item SDI. Similarly, Device D3 obtains from the Storage Array the Encrypted Share ES3; and utilizes the Private Key K3 of Device D3 to locally decrypt the Encrypted Share ES3 into non-encrypted Share S3; which, in turn, may be sent by Device D3 to a particular Requesting Device that needs to utilize the secret data-item SDI. Each of the Devices (D1, D2, D3) actively deletes, from its memory unit and cache unit, the Encrypted Share that it processed (ES1, ES2, ES3) and the non-encrypted Share that it generated (S1, S2, S3), immediately upon completion of its task (of decrypting its Share and sending it out as output).

Encryption Shuffling/Rotation/Cycling:

At a particular time-point, the Management and Mapping Unit determines to perform a shuffling/rotation/cycling among Encrypted Shares, in order to increase the resilience of the system against attacks. The time-point may be selected pseudo-randomly from a pre-defined range (e.g., every T seconds, wherein T is selected pseudo-randomly from the range of 25 to 45 seconds). Alternatively, the time-point may be decided via a deterministic function; for example, the time point may be 15 seconds, then 20 seconds, then 24 seconds, then 27 seconds, and then again repeating the sequence. Other deterministic functions can be used to trigger a shuffling.

In the shuffling process, the following demonstrative set of operations may be performed.

The Management and Mapping Unit determines that shuffling should be performed with regard to Share 1. The Management and Mapping Unit determines that Share 1 was encrypted into Encrypted Share ES1 by Device D1. The Management and Mapping Unit also determines that Device D4 is online and is available to participate in encryption, and that Device D4 did not yet participate in encrypting any Share of this particular secret data-item (SDI). Accordingly, the Management and Mapping Unit instructs Device D1 and Device D4 to operate as follows:

Device D1 obtains the Encrypted Share ES1 from the Storage Array. Device D1 utilizes its Private Key K1, to decrypt that Encrypted Share ES1 into un-encrypted Share S1. Immediately, Device D1 obtains the Public Key of Device D4, and utilizes it as an encryption key to encrypt the un-encrypted Share S1 into a Temporary Encrypted Share TES. Device D1 immediately sends, via a secure communication channel, the Temporary Encrypted Share TES to Device D4. Device D1 also actively deletes, from its memory unit and cache unit, the Encrypted Share ES1, and the un-encrypted Share S1, and the Temporary Encrypted Share TES.

Device D4 receives from Device D1 the Temporary Encrypted Share TES. Device D4 utilizes its own Private Key K4 to decrypt the Temporary Encrypted Share TES, thereby generating the un-encrypted Share S1. Device D4 then immediately utilizes its Private Key K4 as an encryption key to encrypt Share S1 into Updated Encrypted Share UES-1. Device D4 then sends out the Updated Encrypted Share UES-1 to the Storage Array. The Management and Mapping Unit updates its logs, to reflect that the Updated Encrypted Share UES-1 replaces the previous Encrypted Share ES1; and to reflect that the previous Encrypted Share ES1 can be discarded or deleted at the Storage Array; and to reflect that the Updated Encrypted Share UES-1 was encrypted from Share S1 by Device D4 utilizing its own Private Key. In parallel, Device D4 actively deletes from its memory unit and cache unit, the un-encrypted Share S1, and the previous Temporary Encrypted Share TES, and the Updated Encrypted Share UES-1.

Accordingly, the logs of the Management and Mapping Unit now reflect that the secret data-item SDI is now represented by: Updated Encrypted Share UES-1 that was encrypted by Device D4 using its Private Key; and Encrypted Share ES2 that was encrypted by Device D2 using its Private Key; and Encrypted Share ES3 that was encrypted by Device D3 using its Private Key.

Subsequently, the Management and Mapping Unit can orchestrate the decryption or retrieval or utilization of the secret data-item SDI, based on the up-to-date mapping that indicates which Encrypted Share was generated by which Device; and by commanding each relevant Device to obtain and to decrypt (or otherwise utilize) its corresponding Encrypted Share.

Dynamic Rotation/Shuffling: After a pseudo-random time-period or after a pre-defined time-period or a deterministic time-period, such as T1 seconds, the first Encrypted Share ES1 is deleted from Device D1; and to replace it, the Share S1 is securely sent to Device D4, which in turn encrypts it (utilizing its own Private Key, K4) into an Encrypted Share ES4. The secret data-item now has three shares that are stored on Devices D2 and D3 and D4, as Encrypted Shares ES2 and ES3 and ES4, respectively.

In some embodiments, the following method is utilized. A secret data-item is split into a plurality of Shares (or portions, or slices); for example, a single secret data-item S is split into three Shares, denoted S1 and S2 and S3. The secret data-item (S) can be, by itself, an encryption/decryption key that may be used to access a privileged account, to encrypt other data, to decrypt other data, to digitally sign other data, to digitally sign on a transaction, or the like.

In order to encrypt the secret data-item, each of the Shares is sent (over a secure communication channel, such as HTTPS or SSL-TLS) to a different Device; for example, Share S1 is securely sent to Device D1, and Share S2 is securely sent to Device D2, and Share S3 is securely sent o Device D3.

Each one of those Devices utilizes its own secret Private Key to encrypt the Share that was allocated to it; and the Private Key of each Device does not leave that Device.

For example, Device D1 utilizes its own Private Key (K1) to encrypt its Share S1 into an Encrypted Share ES1; and similarly, Device D2 utilizes its own Private Key (K2) to encrypt its Share S2 into an Encrypted Share ES2; and similarly, Device D3 utilizes its own Private Key (K3) to encrypt its Share S3 into an Encrypted Share ES3.

As a result, a plurality of Encrypted Shares (ES1 and ES2 and ES3) of the same secret data-item, are securely stored on a respective plurality of different Devices (D1 and D2 and D3).

Dynamic Rotation/Shuffling: After a pseudo-random time-period or after a pre-defined time-period or a deterministic time-period, such as T1 seconds, the first Encrypted Share ES1 is deleted from Device D1; and to replace it, the Share S1 is securely sent to Device D4, which in turn encrypts it (utilizing its own Private Key, K4) into an Encrypted Share ES4. The secret data-item now has three shares that are stored on Devices D2 and D3 and D4, as Encrypted Shares ES2 and ES3 and ES4, respectively.

By the time that an attacker determines that Encrypted Share ES1 is stored in Device D1, and/or by the time that an attacker compromises Device D1 in order to obtain from it that Encrypted Share ES1 and to decrypt it into Share S1, the Encrypted Share ES1 no longer resides on Device D1.

Similarly, after another pseudo-random time-period or after another pre-defined or deterministic time-period, such as T2 seconds, the second Encrypted Share ES2 is deleted from Device D2; and to replace it, the Share S2 is securely sent to Device D5, which in turn encrypts it (utilizing its own Private Key, K5) into an Encrypted Share ES5. The secret data-item now has three shares that are stored on Devices D3 and D4 and D5, as Encrypted Shares ES3 and ES4 and ES5, respectively.

By the time that an attacker determines that Encrypted Share ES2 is stored in Device D2, and/or by the time that an attacker compromises Device D2 in order to obtain from it that Encrypted Share ES2 and to decrypt it into Share S2, the Encrypted Share ES2 no longer resides on Device D2.

Decryption: In order to decrypt or access or utilize the secret data-item (S), each of the Devices that currently stores an Encrypted Share (ES) of the secret-data-item (S), decrypts that Encrypted Share (ES) using its own Private Key (that never leaves that Device).

For example, in the above example, the secret data-item was split into three Shares (S1 and S2 and S3) that were most-recently stored on Devices D3 and D4 and D5, as Encrypted Shares ES4 and ES5 and ES3, respectively.

In order to decrypt the secret data-item (S), Device D4 utilizes its Private Key K4 to decrypt the Encrypted Share ES4 into Share S1; and similarly, Device D5 utilizes its Private Key K5 to decrypt the Encrypted Share ES5 into Share S2; and similarly, Device D3 utilizes its Private Key K3 to decrypt the Encrypted Share ES3 into Share S3.

The three Shares (S1 and S2 and S3) are now utilized to form the secret data-item S; for example, each one of the three Devices (D4 and D5 and D3) may securely send its decrypted Share (S1 and S2 and S3, respectively) to a single other Device (D6) that may combine the three Shares to form the secret data-item S and to make it accessible to a legitimate user or to otherwise utilize it for a legitimate purpose.

In some embodiments, that secret data-item S may be an Encryption Key (K), that said single other Device (D6) may use to encrypt another data-item or to decrypt another data-item or to digitally sign over another data-item or to digitally sign on a transaction.

In some embodiments, the secret data-item is more resilient to attacks; for example, by the time that an attacker (I) figures out in which Storage Node a particular encrypted share is currently stored, and (II) successfully compromises the relevant and the single Compute Node that has the Private Key that can decrypt that encrypted share, the system has already performed dynamic re-shuffling and/or re-encoding; such that this particular encrypted share is no longer stored on that particular Storage Node, and instead of it, a re-encrypted share was introduced to the system, encrypted by using a Public Key of a different Compute Node, and stored in a different Storage Node.

The terms "secret" or "secret item" or "secret data-item", as used herein, may include any piece of information or digital information (e.g., represented with bits or bytes) that at least one user (e.g., a human user, a corporate entity, a machine-based user) wishes to keep in confidence or wishes it to remain confidential or wishes it to be non-accessible by third parties or wishes it to be non-usable by third parties.

In some embodiments, a "secret" or a "secret item" or a "secret data-item" may be or may include, for example: a particular string of characters, a particular sequence of bits or bytes, a computer file, a textual item or file, a graphical item or file, a video item or file, an audio item or file, an audio/video item or file, a password, a passphrase, a Personal Identification Number (PIN), a hashed value (e.g., an output of a one-way cryptographic hash function) of a password/passphrase/PIN, or the like.

The Applicants have realized that some conventional systems may have difficulties in securely storing and/or processing and/or utilizing a secret data-item, and/or in effectively preventing attacker(s) from obtaining such stored secret data-item.

For example, user Adam may have a username and a secret password that user Adam utilizes to access a privileged account; such as, an online bank account, an email account, an e-commerce account, a social network account, or the like. The secret password may be stored on Adam's end-user device (e.g., smartphone, laptop computer); and an attacker may attack or may compromise Adam's end-user device in order to obtain that secret password. For example, realized the Applicants, an attacker may cause Adam's device to install or to run a malware program, that may obtain the secret password while Adam is typing it, and may send it to the attacker over a communication channel.

Additionally or alternatively, realized the Applicants, the end-user device of user Adam may be lost or stolen; and an attacker who gets physical hold of the device may utilize that device in order to illegitimately access various privileged online services that are related to user Adam (e.g., his bank account, his social network account, his email account).

The Applicants have realized that some conventional systems attempt to utilize store a secret data-item of user Adam on a remote server. However, realized the Applicants, an attacker may compromise the remote server, and may obtain from it the secret data-item of user Adam, without necessarily attacking or compromising the particular end-user device of user Adam.

The Applicants have realized that some conventional systems may enable a user to own a digital currency or a crypto-currency or a Non-Fungible Token (NFT), or to transact with such assets; and typically require the user keep in confidence his passphrase or his "crypto key". The Applicants have further realized that if user Adam attempts to memorize his passphrase but ends up forgetting it, the he may lose or forfeit his cryptocurrency assets. Additionally or alternatively, user Adam may write down his crypto key on paper; but such paper may get lost or destroyed or may get stolen, thereby causing loss or theft of the digital assets that were protected by such crypto key. Alternatively, user Adam may write his crypto key into a file that he stores on his local computer or on a remote server; but such local computer or such remote server may be compromised or "hacked" by an attacker, thereby enabling theft of the digital assets that were protected by such crypto key.

The Applicants have realized that a convention protocol, such as Shamir's Secret Sharing (SSS), may enable distributed storage of "shares" of an encryption key. However, realized the Applicants, a distributed storage of N shares of the encryption key across N different devices, merely multiples by N the number of devices that an attacker would need to compromise. For example, instead of storing a secret data-item in one device (e.g., a single end-user device, or a single remote server), an SSS technique may store N "shares" of the secret data-item, each "share" being stored in one of N respective devices; thereby requiring the attacker to compromise those N devices (or, in some situations, only some or most of them) in order to compromise the secret data-item. The Applicants realized that SSS and similar techniques may increase the number of devices that an attacker (or a group of attackers, or a nation-state attacker) would need to attack or to compromise; however, with sufficient processing resources, such techniques can be overcome.

The Applicants have realized that one of the problems of a conventional "secret sharing" technique is that users of the system, as well as possible attackers, know on which particular devices those "shares" of the secret are stored; and such attacker(s) can thus particularly target and attack those particular devices in order to obtain from them (or, from a sufficient number of them) those "shares" of the secret.

Some embodiments provide a system and method for secret sharing that is more resilient to attacks, and may be referred to as "Security by Community" or "Security via a Community". Firstly, a secret data-item is divided into numerous Shares (or portions); for example, hundreds or thousands of Shares for a single secret. Secondly, those Shares are distributed across a plurality of devices, particularly end-user devices (and/or servers). Thirdly, the system dynamically changes the location of each Share, every T seconds or minutes; such that a particular Share of the secret (e.g., the 117th Share of the secret) is stored now on Device number 147, and in one minute it is deleted from Device number 147 and it is stored in Device number 253, and after another minute it is deleted from Device number 253 and is stored in Device number 509, and so forth; such that the various devices that store the Shares of the secret are dynamically and automatically changed, and such that (for example) by the time that an Attacker managed to compromise Device number 253, the Share of the secret is no longer stored in Device number 253 but was already "moved" to Device number 509. Fourthly, the system utilized redundancy such that multiple copies of each particular Share of the secret are stored across a plurality of different devices, and some of these devices are offline and are online in non-predictable manner or in pseudo-random manner (or, at least some devices are not continuously online); thereby providing additional resilience to some of the Share copies, and thereby providing additional entropy since an attacker cannot predict which device(s) will be online at a particular time-slot, and even if such information is predicted or estimated or guesses then the Share of the secret may no longer be on such Device during its online time-slot. In accordance with some embodiments, the numerous Shares of a secret do not remain on a single device, and do not remain distributed across a particular non-changing group of N devices; but rather, such Shares (including duplicates of such Shares) are randomly or pseudo-randomly moved or shuffled or stored across a subset of the devices that participate in the system, and the storage location (as well as the encryption key) for each particular Share is dynamically changed after a short time-interval (e.g., a few seconds, a few minutes).

Some embodiments provide a system comprising: one or more hardware processors that are configured to execute code; and one or more memory units that are configured to store code and data; wherein the one or more hardware processors are configured to perform a process comprising: (a) receiving or generating a secret data-item (S) that is intended to be securely stored; (b) dividing the secret data-item (S) into a plurality of shares, that comprise at least a first share (S-1) and a second share (S-2); (c) at a first electronic device, locally encrypting the first share (S-1) of the secret data-item into a first encrypted share (ES-1), by using a private encryption key of the first electronic device as encryption key for encrypting the first share (S-1) into the first encrypted share (ES-1); (d) at a second, different, electronic device, locally encrypting a second share (S-2) of the secret data-item into a second encrypted share (ES-2), by using a private encryption key of the second electronic device as encryption key for encrypting the second share (S-2) into the second encrypted share (ES-2); (e) storing the first encrypted share (ES-1) and the second encrypted share (ES-2) on one or more storage devices; (f) subsequently, dynamically replacing the first encrypted share (ES-1) with a replacement encrypted share (ES-1B) that is the first share (S-1) of the secret data-item (S) encrypted by using a private encryption key of a third electronic device as encryption key.

In some embodiments, the replacement of an already-encrypted share with a freshly-encrypted share is performed in series or in a staggered process; for example, initially the first encrypted shares (ES-1 and ES-2) are generated and are stored; then, at a subsequent time-point, only the first encrypted share (ES-1) is replaced by a replacement version (ES-1B), while the second encrypted share (ES-2) is maintained without changes; then, at another subsequent time-point, only the second encrypted share (ES-2) is replaced by a replacement version (ES-2B), while the other encrypted share (ES-1B) is maintained without changes; then, at another subsequent time-point, the replacement version of the first encrypted share (ES-1B) is again replaced by yet a newly encrypted version (ES-1C) of the first share, while the second encrypted share (ES-2B) is maintained; and so forth, in a staggered process. This may provide improved resilience against attacks, relative to merely replacing all the N encrypted shares, at the same time or in a short time-period (e.g., of a few seconds), with a new set of N replacement encrypted shares; and/or may provide resilience against attacks while also saving in compute resources and/or by saving on the need to send and receive encrypted shares among nodes.

In some embodiments, step (f) is performed periodically at pre-defined time intervals. In some embodiments, step (f) is performed at time-points that are selected pseudo-randomly from a range that defines a minimum time-point and a maximum time-point for share replacement.

In some embodiments, the replacing of step (f) comprises: (f1) at the first electronic device, receiving the first encrypted share (ES-1); (f2) at the first electronic device, decrypting the first encrypted share (ES-1) by using the private key of the first electronic device, and temporarily generating the first share (S-1); (f3) at the first electronic device, encrypting the first share (S-1) by using a public encryption key of the third electronic device as encryption key, and generating a temporary replacement encrypted version of the first share (ES-1A); (f4) transferring the temporary replacement encrypted version of the first share (ES-1A) to the third electronic device; (f5) at the third electronic device, decrypting the temporary replacement encrypted version of the first share (ES-1A) by using the private key of the third electronic device, and temporarily generating the first share (S-1); (f6) at the third electronic device, encrypting the first share (S-1) by using a private encryption key of the third electronic device as encryption key, and generating said replacement encrypted share (ES-1B); (f7) at said one or more storage devices, deleting the first encrypted share (ES-1), and storing said replacement encrypted share (ES-1B).

In some embodiments, each electronic device in the system is configured to encrypt not more than one share of said secret data-item.

In some embodiments, a control node in the system is configured to manage (i) division of the secret data-item into shares, and (ii) allocation of each share of the secret data-item to a different compute node for generating encrypted shares, and (iii) storage of the encrypted shares at the one or more storage devices, and (iv) subsequently causing replacement of encrypted shares with replacement encrypted shares to enhance resilience against attacks.

In some embodiments, each compute node broadcasts or signals, to other nodes of the system, whether or not said compute node is available to perform tasks of encrypted a share of the secret data-item.

In some embodiments, availability of a compute node to perform encryption tasks if signaled by said compute node being logged-in to a particular service or website.

In some embodiments, availability of a compute node to perform encryption tasks if signaled by said compute node being connected to the Internet and having a particular browser extension running, wherein said particular browser extension is configured to perform encryption of a share of the secret data-item.

In some embodiments, the control node is configured to enforce a distributed storage mechanism, in which a first storage device stores the first encrypted share (ES-1) that was encrypted with the private encryption key of the first electronic device, and wherein a second storage device stores the second encrypted share (ES-2) that was encrypted with the private encryption key of the second electronic device.

In some embodiments, the control node is configured to enforce a distributed storage mechanism, in which a first storage device stores the first encrypted share (ES-1) that was encrypted with the private encryption key of the first electronic device, and wherein a second storage device stores the second encrypted share (ES-2) that was encrypted with the private encryption key of the second electronic device; wherein the replacement encrypted share (ES-1B), which is the first share of the secret data-item that was encrypted with the private encryption key of the third electronic device, is stored in a third storage device and not in the first storage device and not in the second storage device.

In some embodiments, the control node is configured to enforce a non-distributed storage mechanism, in which a single storage device stores both: (i) the first encrypted share (ES-1) that was encrypted with the private encryption key of the first electronic device, and also (ii) the second encrypted share (ES-2) that was encrypted with the private encryption key of the second electronic device.

In some embodiments, the control node is configured to enforce a non-distributed storage mechanism, in which a single storage device stores both: (i) the first encrypted share (ES-1) that was encrypted with the private encryption key of the first electronic device, and also (ii) the second encrypted share (ES-2) that was encrypted with the private encryption key of the second electronic device; wherein the replacement encrypted share (ES-1B), which is the first share of the secret data-item that was encrypted with the private encryption key of the third electronic device, is subsequently also stored in said single storage device and replaces the first encrypted share (ES-1).

In some embodiments, the first electronic device never sees an entirety of the secret data-item; wherein the second electronic device never sees the entirety of the secret data-item; wherein the third electronic device never sees the entirety of the secret data-item.

In some embodiments, the first electronic device is configured to actively delete, from any volatile and non-volatile memory units of the first electronic device, any copy of a non-encrypted version of the first share (S-1), immediately upon completing an encryption task of said first share (ES-1) into the first encrypted share (ES-1); wherein the second electronic device is configured to actively delete, from any volatile and non-volatile memory units of the second electronic device, any copy of a non-encrypted version of the second share (S-2), immediately upon completing an encryption task of said second share (S-2) into the second encrypted share (ES-2).

In some embodiments, the first electronic device is configured to actively overwrite, in any volatile and non-volatile memory units of the first electronic device, any copy of a non-encrypted version of the first share (S-1), immediately upon completing an encryption task of said first share (ES-1) into the first encrypted share (ES-1); wherein the second electronic device is configured to actively overwrite, in any volatile and non-volatile memory units of the second electronic device, any copy of a non-encrypted version of the second share (S-2), immediately upon completing an encryption task of said second share (S-2) into the second encrypted share (ES-2).

In some embodiments, the system is configured to automatically: divide the secret data item into shares, and encrypt each share using a private encryption key of a different electronic device, and store each encrypted share in a different storage device, and dynamically replace (i) a previously-encrypted share that was encrypted with a first private key of a first device and was stored in a first particular storage device, with (ii) a freshly-encrypted share that was encrypted with a second private key of a second device and is stored in a second particular storage device.

In some embodiments, the secret data-item is, by itself, a digital access key that enables digital access to a privileged resource; wherein the system is configured to automatically: upon creation of the digital access key which is the secret data item, divide said secret data item into shares, and encrypt each share using a private encryption key of a different electronic device, and store each encrypted share in a different storage device, and dynamically replace (i) a previously-encrypted share that was encrypted with a first private key of a first device and was stored in a first particular storage device, with (ii) a freshly-encrypted share that was encrypted with a second private key of a second device and is stored in a second particular storage device; wherein a request of an authorized user to utilize said digital access key in order to access said privileged resource, automatically invokes (I) decryption of the plurality of shares that were encrypted with different private keys, and (II) reassembly of the digital access key, and (III) submission of the digital access key to an access control unit of said privileged resource.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
one or more hardware processors that are configured to execute code;
one or more memory units that are configured to store code and data;
wherein the one or more hardware processors are configured to perform a process comprising:
(a) receiving or generating a secret data-item (S) that is intended to be securely stored;
(b) dividing the secret data-item (S) into a plurality of shares, that comprise at least a first share (S-1) and a second share (S-2);
(c) at a first electronic device, locally encrypting the first share (S-1) of the secret data-item into a first encrypted share (ES-1), by using a private encryption key of the first electronic device as encryption key for encrypting the first share (S-1) into the first encrypted share (ES-1);
(d) at a second, different, electronic device, locally encrypting a second share (S-2) of the secret data-item into a second encrypted share (ES-2), by using a private encryption key of the second electronic device as encryption key for encrypting the second share (S-2) into the second encrypted share (ES-2);

(e) storing the first encrypted share (ES-1) and the second encrypted share (ES-2) on one or more storage devices;

(f) subsequently, dynamically replacing the first encrypted share (ES-1) with a replacement encrypted share (ES-1B) that is the first share (S-1) of the secret data-item (S) encrypted by using a private encryption key of a third electronic device as encryption key.

2. The system of claim 1,
wherein step (f) is performed periodically at pre-defined time intervals.

3. The system of claim 1,
wherein step (f) is performed at time-points that are selected pseudo-randomly from a range that defines a minimum time-point and a maximum time-point for share replacement.

4. The system of claim 1,
wherein the replacing of step (f) comprises:
(f1) at the first electronic device, receiving the first encrypted share (ES-1);
(f2) at the first electronic device, decrypting the first encrypted share (ES-1) by using the private key of the first electronic device, and temporarily generating the first share (S-1);
(f3) at the first electronic device, encrypting the first share (S-1) by using a public encryption key of the third electronic device as encryption key, and generating a temporary replacement encrypted version of the first share (ES-1A);
(f4) transferring the temporary replacement encrypted version of the first share (ES-1A) to the third electronic device;
(f5) at the third electronic device, decrypting the temporary replacement encrypted version of the first share (ES-1A) by using the private key of the third electronic device, and temporarily generating the first share (S-1);
(f6) at the third electronic device, encrypting the first share (S-1) by using a private encryption key of the third electronic device as encryption key, and generating said replacement encrypted share (ES-1B);
(f7) at said one or more storage devices, deleting the first encrypted share (ES-1), and storing said replacement encrypted share (ES-1B).

5. The system of claim 1,
wherein each electronic device in the system is configured to encrypt not more than one share of said secret data-item.

6. The system of claim 1,
wherein a control node in the system is configured to manage (i) division of the secret data-item into shares, and (ii) allocation of each share of the secret data-item to a different compute node for generating encrypted shares, and (iii) storage of the encrypted shares at the one or more storage devices, and (iv) subsequently causing replacement of encrypted shares with replacement encrypted shares to enhance resilience against attacks.

7. The system of claim 6,
wherein the compute nodes broadcast or signal, to other nodes of the system, whether or not said compute nodes are available to perform tasks of encrypting a share of the secret data-item.

8. The system of claim 7,
wherein availability of the compute nodes to perform encryption tasks is signaled by said compute nodes being logged-in to a particular service or website.

9. The system of claim 8,
wherein availability of the compute nodes to perform encryption tasks is signaled by said compute nodes being connected to the Internet and having a particular browser extension running, wherein said particular browser extension is configured to perform encryption of a share of the secret data-item.

10. The system of claim 1,
wherein a control node is configured to enforce a distributed storage mechanism, in which a first storage device stores the first encrypted share (ES-1) that was encrypted with the private encryption key of the first electronic device, and wherein a second storage device stores the second encrypted share (ES-2) that was encrypted with the private encryption key of the second electronic device.

11. The system of claim 1,
wherein a control node is configured to enforce a distributed storage mechanism, in which a first storage device stores the first encrypted share (ES-1) that was encrypted with the private encryption key of the first electronic device, and wherein a second storage device stores the second encrypted share (ES-2) that was encrypted with the private encryption key of the second electronic device; wherein the replacement encrypted share (ES-1B), which is the first share of the secret data-item that was encrypted with the private encryption key of the third electronic device, is stored in a third storage device and not in the first storage device and not in the second storage device.

12. The system of claim 1,
wherein a control node is configured to enforce a non-distributed storage mechanism, in which a single storage device stores both: (i) the first encrypted share (ES-1) that was encrypted with the private encryption key of the first electronic device, and also (ii) the second encrypted share (ES-2) that was encrypted with the private encryption key of the second electronic device.

13. The system of claim 1,
wherein a control node is configured to enforce a non-distributed storage mechanism, in which a single storage device stores both: (i) the first encrypted share (ES-1) that was encrypted with the private encryption key of the first electronic device, and also (ii) the second encrypted share (ES-2) that was encrypted with the private encryption key of the second electronic device; wherein the replacement encrypted share (ES-1B), which is the first share of the secret data-item that was encrypted with the private encryption key of the third electronic device, is subsequently also stored in said single storage device and replaces the first encrypted share (ES-1).

14. The system of claim 1,
wherein the first electronic device never sees an entirety of the secret data-item;
wherein the second electronic device never sees the entirety of the secret data-item;
wherein the third electronic device never sees the entirety of the secret data-item.

15. The system of claim 1,
wherein the first electronic device is configured to actively delete, from any volatile and non-volatile memory units of the first electronic device, any copy of a non-encrypted version of the first share (S-1), immediately upon completing an encryption task of said first share (ES-1) into the first encrypted share (ES-1);

wherein the second electronic device is configured to actively delete, from any volatile and non-volatile memory units of the second electronic device, any copy of a non-encrypted version of the second share (S-2), immediately upon completing an encryption task of said second share (S-2) into the second encrypted share (ES-2).

16. The system of claim 1,
wherein the first electronic device is configured to actively overwrite, in any volatile and non-volatile memory units of the first electronic device, any copy of a non-encrypted version of the first share (S-1), immediately upon completing an encryption task of said first share (ES-1) into the first encrypted share (ES-1);
wherein the second electronic device is configured to actively overwrite, in any volatile and non-volatile memory units of the second electronic device, any copy of a non-encrypted version of the second share (S-2), immediately upon completing an encryption task of said second share (S-2) into the second encrypted share (ES-2).

17. The system of claim 1, wherein the system is configured to automatically:
divide the secret data item into shares,
and encrypt each share using a private encryption key of a different electronic device,
and store each encrypted share in a different storage device,
and dynamically replace (i) a previously-encrypted share that was encrypted with a first private key of a first device and was stored in a first particular storage device, with (ii) a freshly-encrypted share that was encrypted with a second private key of a second device and is stored in a second particular storage device.

18. The system of claim 1,
wherein the secret data-item is, by itself, a digital access key that enables digital access to a privileged resource;
wherein the system is configured to automatically:
upon creation of the digital access key which is the secret data item, divide said secret data item into shares,
and encrypt each share using a private encryption key of a different electronic device,
and store each encrypted share in a different storage device,
and dynamically replace (i) a previously-encrypted share that was encrypted with a first private key of a first device and was stored in a first particular storage device, with (ii) a freshly-encrypted share that was encrypted with a second private key of a second device and is stored in a second particular storage device;
wherein a request of an authorized user to utilize said digital access key in order to access said privileged resource, automatically invokes (I) decryption of the plurality of shares that were encrypted with different private keys, and (II) reassembly of the digital access key, and (III) submission of the digital access key to an access control unit of said privileged resource.

19. A method comprising:
(a) receiving or generating a secret data-item (S) that is intended to be securely stored;
(b) dividing the secret data-item (S) into a plurality of shares, that comprise at least a first share (S-1) and a second share (S-2);
(c) at a first electronic device, locally encrypting the first share (S-1) of the secret data-item into a first encrypted share (ES-1), by using a private encryption key of the first electronic device as encryption key for encrypting the first share (S-1) into the first encrypted share (ES-1);
(d) at a second, different, electronic device, locally encrypting a second share (S-2) of the secret data-item into a second encrypted share (ES-2), by using a private encryption key of the second electronic device as encryption key for encrypting the second share (S-2) into the second encrypted share (ES-2);
(e) storing the first encrypted share (ES-1) and the second encrypted share (ES-2) on one or more storage devices;
(f) subsequently, dynamically replacing the first encrypted share (ES-1) with a replacement encrypted share (ES-1B) that is the first share (S-1) of the secret data-item (S) encrypted by using a private encryption key of a third electronic device as encryption key;
wherein the method is implemented by utilizing at least a hardware processor.

20. A non-transitory storage article having stored thereon instructions that, when executed by a machine, cause the machine to perform a method comprising:
(a) receiving or generating a secret data-item (S) that is intended to be securely stored;
(b) dividing the secret data-item (S) into a plurality of shares, that comprise at least a first share (S-1) and a second share (S-2);
(c) at a first electronic device, locally encrypting the first share (S-1) of the secret data-item into a first encrypted share (ES-1), by using a private encryption key of the first electronic device as encryption key for encrypting the first share (S-1) into the first encrypted share (ES-1);
(d) at a second, different, electronic device, locally encrypting a second share (S-2) of the secret data-item into a second encrypted share (ES-2), by using a private encryption key of the second electronic device as encryption key for encrypting the second share (S-2) into the second encrypted share (ES-2);
(e) storing the first encrypted share (ES-1) and the second encrypted share (ES-2) on one or more storage devices;
(f) subsequently, dynamically replacing the first encrypted share (ES-1) with a replacement encrypted share (ES-1B) that is the first share (S-1) of the secret data-item (S) encrypted by using a private encryption key of a third electronic device as encryption key.

* * * * *